United States Patent
Antaya et al.

(10) Patent No.: US 12,036,628 B2
(45) Date of Patent: *Jul. 16, 2024

(54) ELECTRICAL CONNECTOR

(71) Applicant: Aptiv Technologies AG, Schaffhausen (CH)

(72) Inventors: Stephen Antaya, West Kingston, RI (US); William Falk, Warwick, RI (US); Justin Amalfitano, East Providence, RI (US); Amit Datta, East Greenwich, RI (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,662

(22) Filed: Apr. 28, 2023

(65) Prior Publication Data

US 2023/0264303 A1    Aug. 24, 2023

Related U.S. Application Data

(63) Continuation of application No. 17/835,153, filed on Jun. 8, 2022, now Pat. No. 11,738,412, which is a
(Continued)

(51) Int. Cl.
*B23K 35/26* (2006.01)
*B23K 103/00* (2006.01)
(Continued)

(52) U.S. Cl.
CPC ............ *B23K 35/262* (2013.01); *C22C 13/00* (2013.01); *C22C 30/04* (2013.01); *C22C 30/06* (2013.01);
(Continued)

(58) Field of Classification Search
None
See application file for complete search history.

(56) References Cited

U.S. PATENT DOCUMENTS 6,680,128 B2   1/2004   Mei
6,767,411 B2   7/2004   Yeh et al.
(Continued)

FOREIGN PATENT DOCUMENTS

CN    1154403 A    7/1997
CN    104690442 A    6/2015
(Continued)

OTHER PUBLICATIONS

"Extended European Search Report Received mailed Nov. 2, 2021", 11 pages.
(Continued)

*Primary Examiner* — Xiaobei Wang
(74) *Attorney, Agent, or Firm* — Billion & Armitage

(57) ABSTRACT

An electrical connector includes a first layer formed of a copper based material and a second layer formed of an iron-nickel alloy. The second layer has a thickness of 8% to 30% of the thickness of the electrical connector. The electrical connector also includes a third layer which is formed of a solder alloy that consists essentially of 17% to 28% indium by weight, 12% to 20% zinc by weight, 1% to 6% silver by weight, 1% to 3% copper by weight, and a remaining weight of the solder alloy that is tin.

7 Claims, 9 Drawing Sheets

Related U.S. Application Data continuation of application No. 17/027,036, filed on Sep. 21, 2020, now Pat. No. 11,383,330.

(51) Int. Cl.
*B23K 103/02* (2006.01)
*B23K 103/12* (2006.01)
*C22C 13/00* (2006.01)
*C22C 30/04* (2006.01)
*C22C 30/06* (2006.01)

(52) U.S. Cl.
CPC ...... *B23K 2103/02* (2018.08); *B23K 2103/12* (2018.08); *B23K 2103/54* (2018.08); *Y10T 428/12597* (2015.01); *Y10T 428/12715* (2015.01); *Y10T 428/12722* (2015.01)

(56) References Cited

U.S. PATENT DOCUMENTS

| | | | |
|---|---|---|---|
| 7,617,964 | B2 | 11/2009 | Winter et al. |
| 9,931,716 | B2 | 4/2018 | Ikeda et al. |
| 9,975,207 | B2 | 5/2018 | Hwang et al. |
| 9,981,347 | B2 | 5/2018 | Pereira et al. |
| 10,105,794 | B2 | 10/2018 | Hwang et al. |
| 2005/0007234 | A1 | 1/2005 | Wada et al. |
| 2006/0067852 | A1 | 3/2006 | Suh et al. |
| 2006/0261131 | A1 | 11/2006 | Hirata et al. |
| 2008/0318793 | A1 | 12/2008 | Somerkoski |
| 2012/0318566 | A1 | 12/2012 | Reul et al. |
| 2014/0044589 | A1 | 2/2014 | Jeong et al. |
| 2014/0158424 | A1* | 6/2014 | Schlarb .............. B23K 1/19 174/94 R |
| 2015/0296615 | A1 | 10/2015 | Schmalbuch et al. |
| 2017/0368642 | A1 | 12/2017 | Pereira et al. |

FOREIGN PATENT DOCUMENTS

| | | |
|---|---|---|
| CN | 107635717 A | 1/2018 |
| CN | 108436323 A | 8/2018 |
| CN | 109648222 A | 4/2019 |
| CN | 109702372 A | 5/2019 |
| EP | 1614500 A1 | 1/2006 |
| EP | 1922175 B1 | 9/2019 |
| JP | 2000141078 A | 5/2000 |
| JP | 2004307958 A | 11/2004 |
| JP | 2011031253 A | 2/2011 |
| TW | I301854 B | 10/2008 |
| WO | 9709455 A1 | 3/1997 |

OTHER PUBLICATIONS

"First Office Action Received mailed on Dec. 5, 2023", 2 Pages.
"Second Office Action Received mailed on Mar. 14, 2023", 10 Pages.

* cited by examiner

ELECTRICAL CONNECTOR

CROSS REFERENCE TO RELATED APPLICATIONS

This application is a continuation of co-pending U.S. patent application Ser. No. 17/835,153 filed on Jun. 8, 2022, which is a continuation of U.S. patent application Ser. No. 17/027,036 filed on Sep. 21, 2020, now U.S. Pat. No. 11,383,330, the entire disclosure of each of which is hereby incorporated by reference.

TECHNICAL FIELD OF THE INVENTION

The present invention relates generally to electrical connectors and more particularly to electrical connectors with a layer of a lead-free solder composition suitable for electrical terminals attached to an electrical contact pad, for example on a glass surface.

BACKGROUND OF THE INVENTION

Lead-based solder has been used for soldering electrical terminals to silver grids printed on automotive glass since the heated grid was developed. Indium-based solders were used under special circumstances on annealed glass windshields where the product was particularly sensitive to cracking. Physical properties of high indium-based solders provided better resistance to cracking than lead-based solder but was cost prohibitive in regular production.

In the year 2000, the European Union issued a directive to prohibit the use of lead in automotive glass applications after 2003. Although lead would be exempted from this directive for many years, some OEMs and glass suppliers were proactive in the validation and use of lead-free solder. Indium-based lead-free solders developed by Antaya Technologies Corporation have been widely used by glass suppliers globally for both tempered and annealed automotive glass.

The higher cost of indium versus other solder alloy metals has been a barrier to wider application of indium-based lead-free solder. As an alternative, some glass suppliers have developed a process to use high tin (98% tin, 2% silver) solder in combination with an electrical terminal having a stainless-steel base material for tempered glass applications. This high tin solder has the advantage of being inexpensive and the stainless steel provides the benefit of a coefficient of thermal expansion that is close to that of tempered glass. However, this alternative still has drawbacks of causing some glass cracking, a narrow processing temperature window, additional process steps of preheating, controlled cooling of the glass, and a need for silver plating to improve electrical conductivity.

Therefore, the need for electrical terminal capable of being soldered on tempered automotive glass using a lower cost solder than lead-free solder having a high, i.e., greater than 50%, indium content and avoids the drawbacks of the high-tin solder/stainless steel solution described above remains desired.

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

According to one embodiment, an electrical assembly is provided. The electrical assembly includes an electrical connector having a first layer formed of a copper based material and a second layer formed of an iron-nickel alloy. The second layer has a thickness of 8% to 30% of the thickness of the electrical connector. The electrical assembly further includes a layer of a solder alloy consisting essentially of about 15% to 28% indium by weight, about 5% to 20% zinc by weight, about 1% to 6% silver by weight, and a remaining weight of the solder alloy being tin.

In an example embodiment having one or more features of the electrical assembly of the previous paragraph, the solder alloy consists essentially of 21% to 27% indium by weight, 8% to 10% zinc by weight, 2% to 4% silver by weight, and a remaining weight of the solder alloy being tin.

In an example embodiment having one or more features of the electrical assembly of one or more of the previous paragraphs, the solder alloy consists essentially of: about 24% indium by weight, about 9% zinc by weight, about 3% silver by weight, and a remaining weight of the solder alloy being tin.

In an example embodiment having one or more features of the electrical assembly of one or more of the previous paragraphs, the second layer is soldered to a silver-based connection pad.

In an example embodiment having one or more features of the electrical assembly of one or more of the previous paragraphs, silver-based connection pad is disposed on a glass surface.

According to one embodiment, an electrical assembly is provided. The electrical assembly includes an electrical connector soldered to a conductive pad disposed on a glass surface by a solder alloy consisting essentially of 17% to 28% indium by weight, 12% to 20% zinc by weight, 1% to 6% silver by weight, and a remaining weight of the solder alloy being tin.

In an example embodiment having one or more features of the electrical assembly of the previous paragraph, the solder alloy includes about 18% indium by weight.

In an example embodiment having one or more features of the electrical assembly of one or more of the previous paragraphs, the solder alloy includes about 22% indium by weight.

In an example embodiment having one or more features of the electrical assembly of one or more of the previous paragraphs, the solder alloy includes about 24% indium by weight.

In an example embodiment having one or more features of the electrical assembly of one or more of the previous paragraphs, the solder alloy includes about 3% silver by weight.

In an example embodiment having one or more features of the electrical assembly of one or more of the previous paragraphs, the solder alloy includes about 5% silver by weight.

In an example embodiment having one or more features of the electrical assembly of one or more of the previous paragraphs, the electrical connector has a first layer formed of a copper based material and a second layer formed of an iron-nickel alloy and wherein the second layer has a thickness 8% to 30% of the thickness of the electrical connector.

According to one embodiment, an electrical assembly is provided. The electrical assembly includes an electrical connector soldered to a conductive pad disposed on a glass surface by a solder alloy consisting essentially of 17% to 28% indium by weight, 12% to 20% zinc by weight, 1% to 6% silver by weight, 1% to 3% copper by weight, and a remaining weight of the solder alloy being tin.

In an example embodiment having one or more features of the electrical assembly of the previous paragraph, the solder alloy includes about 18% indium by weight.

In an example embodiment having one or more features of the electrical assembly of one or more of the previous paragraphs, the solder alloy includes about 22% indium by weight.

In an example embodiment having one or more features of the electrical assembly of one or more of the previous paragraphs, the solder alloy includes about 24% indium by weight.

In an example embodiment having one or more features of the electrical assembly of one or more of the previous paragraphs, the solder alloy includes about 3% silver by weight.

In an example embodiment having one or more features of the electrical assembly of one or more of the previous paragraphs, the solder alloy includes about 5% silver by weight.

In an example embodiment having one or more features of the electrical assembly of one or more of the previous paragraphs, the electrical connector has a first layer formed of a copper based material and a second layer formed of an iron-nickel alloy and wherein the second layer has a thickness 8% to 30% of the thickness of the electrical connector.

BRIEF DESCRIPTION OF THE SEVERAL VIEWS OF THE DRAWING

The present invention will now be described, by way of example with reference to the accompanying drawings, in which.

Figure 1:
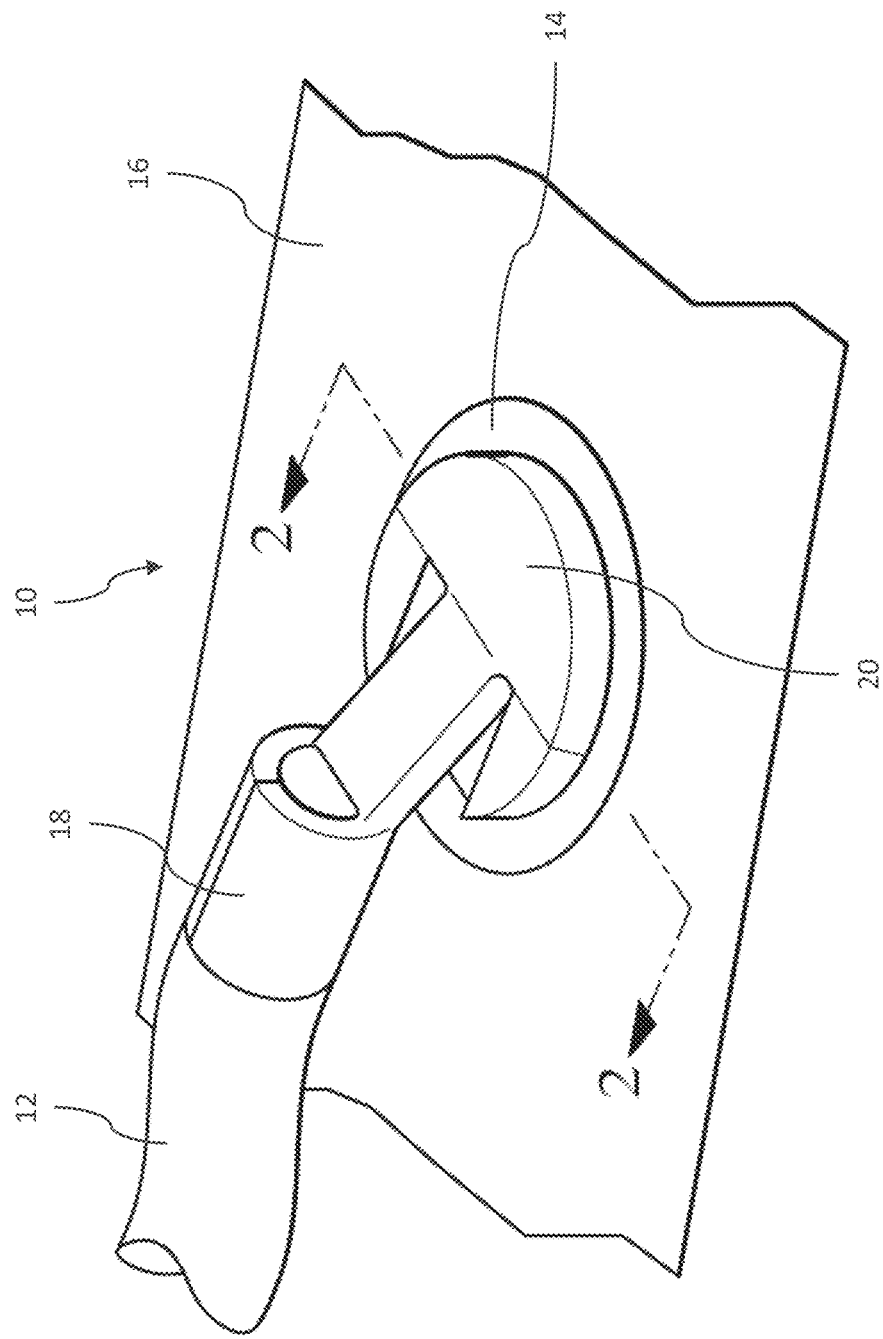
FIG. 1 illustrates an example of an electrically conductive connector designed according to some embodiments.

The following additional figures are referenced in Appendix A:

FIG. 10 is photomicrograph of a solder joint according to some embodiments;

FIG. 11 is photomicrograph of a solder joint according to some embodiments;

FIG. 12 is a is ternary phase diagram of tin, indium, and zinc overlaid with glass cracking test results according to some embodiments;

FIG. 13 is a graph of the number of glass cracks vs. indium alloys of a solder alloy on an electrical terminal for various power profiles according to some embodiments;

FIG. 14 is another graph of the number of glass cracks vs. indium alloys of a different solder alloy on a different electrical terminal for various power profiles according to some embodiments;

FIG. 15 is yet another graph of the number of glass cracks vs. indium alloys of a different solder alloy on a different electrical terminal according to some embodiments;

FIG. 16 is cross section view of an electrical connector soldered to a silver coated glass surface according to some embodiments;

FIG. 17 is a finite element analysis graph of a glass solder interface of an electrical terminal connected to a glass surface by a first solder alloy according to some embodiments;

FIG. 18 is a finite element analysis graph of a glass solder interface of an electrical terminal connected to a glass surface by a second solder alloy according to some embodiments;

FIG. 19 is a finite element analysis graph of a glass solder interface of an electrical terminal connected to a glass surface by a third solder alloy according to some embodiments;

FIG. 20 is a finite element analysis graph of a glass solder interface of an electrical terminal connected to a glass surface by a fourth solder alloy according to some embodiments;

FIGS. 21A-21D are elemental maps showing concentrations of silver, zinc, tin, and indium in a solder joint formed of a solder alloy according to some embodiments;

FIGS. 22A and 22B are optical micrographs and scanning electron micrographs of a solder joint formed of a first solder alloy according to some embodiments;

FIGS. 23A and 23B are optical micrographs and scanning electron micrographs of a solder joint formed of a second solder alloy according to some embodiments;

FIGS. 24A and 24B are optical micrographs and scanning electron micrographs of a solder joint formed of a third solder alloy according to some embodiments;

FIG. 25 is an elemental map of a solder joint formed of a first solder alloy according to some embodiments;

FIG. 26 is an elemental map of a solder joint formed of a second solder alloy according to some embodiments; and FIG. 27 is an elemental map of a solder joint formed of a first solder alloy according to some embodiments.

DETAILED DESCRIPTION OF THE INVENTION

Reference will now be made in detail to embodiments, examples of which are illustrated in the accompanying drawings. In the following detailed description, numerous specific details are set forth to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 2:
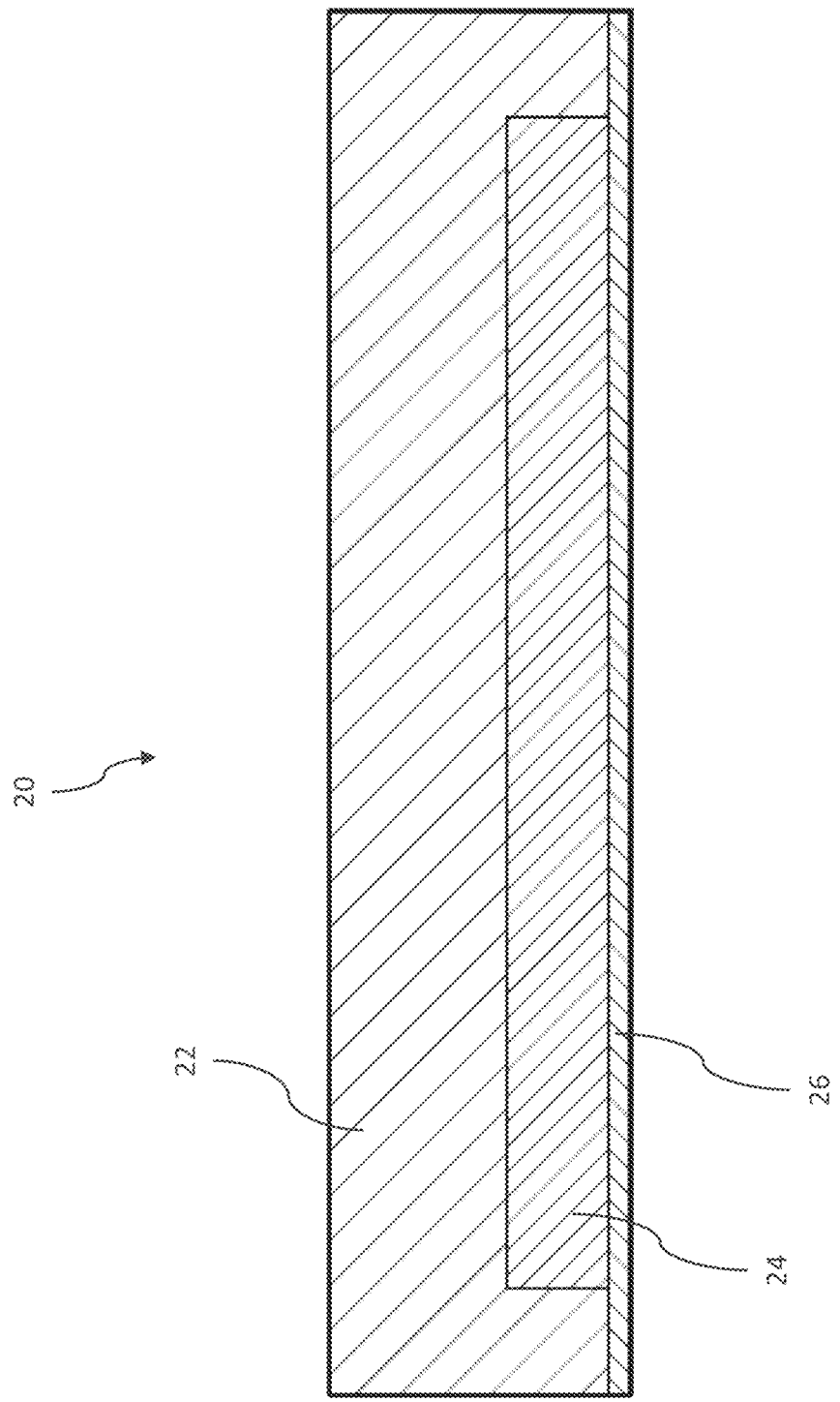
FIG. 2 is a cross section diagram schematically illustrating an arrangement of layers in the electrical connector taken along the lines 2-2 in FIG. 1 according to some embodiments.
Figure 3:
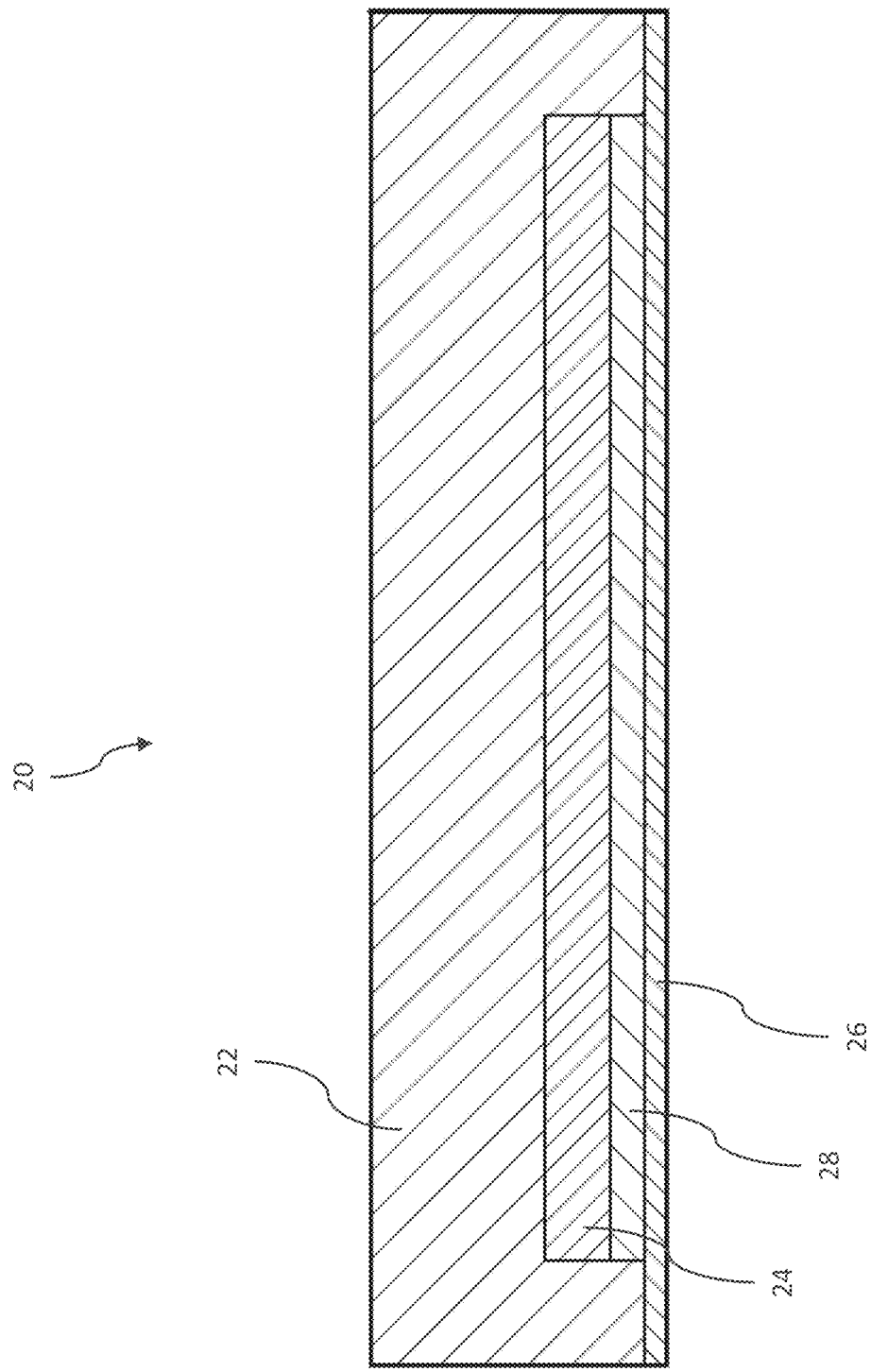
FIG. 3 is a cross section diagram schematically illustrating an arrangement of layers of another example electrically conductive connector designed according to some embodiments.

FIG. 1 illustrates an example of an electrical connector 10 that is adapted to make an electrical connection between a wire electrical cable 12 and a conductive contact pad 14 on a planar surface 16, such as a glass windshield or rear window of an automobile. This connector may be used to establish electrical connections from the vehicle's wiring system to circuits, such as heaters or antennae on the glass surface. The conductive contact pad 14 is typically silver-based. As shown in FIG. 1, the connector 10 has a wire attachment portion 18 that is crimped to the wire cable 12 and a planar contact portion 20. As shown in FIGS. 2 and 3, the contact portion 20 has at least two layers 22, 24 of electrically conductive material. The first layer 22, formed from, for example, a copper-based alloy has a coefficient of thermal expansion (CTE) that is greater than the CTE of the second layer 24, formed from, for example, an iron-nickel alloy. Two examples of suitable iron-nickel alloys are INVAR (typical composition 64% Fe, 36% Ni) or KOVAR (typical composition 54% Fe, 29% Ni, 17% Co). The difference between the coefficient of thermal expansion of the material forming the first layer 22 and the coefficient of thermal expansion of glass is greater than the difference between the coefficient of thermal expansion of the material forming the second layer 24 and the coefficient of thermal expansion of glass.

As shown in FIG. 2, a layer of a solder alloy 26 overlays at least a portion of the second layer 24 of the contact portion 20. The solder layer 26 is in direct and intimate contact with the second layer 24. As shown in FIG. 3, the contact portion 20 also includes a third layer 28 of material overlaying the second layer 24 and the solder layer may be in direct or intimate contact with a portion of the third layer 28 while still overlaying the second layer 24. This third layer 28 may be formed of a copper or tin based alloy and may improve the wetting of the solder to the contact portion 20. The third layer 28 may be clad with or plated on the second layer.

To prevent glass cracking caused by a difference in CTE between the contact portion 20 and the glass surface 16, a lower liquidus temperature is preferred. However, to meet the environmental requirements, a higher solidus temperature is needed to prevent failure of the solder joint between the contact portion 20 and the contact pad 14.

Figure 4:
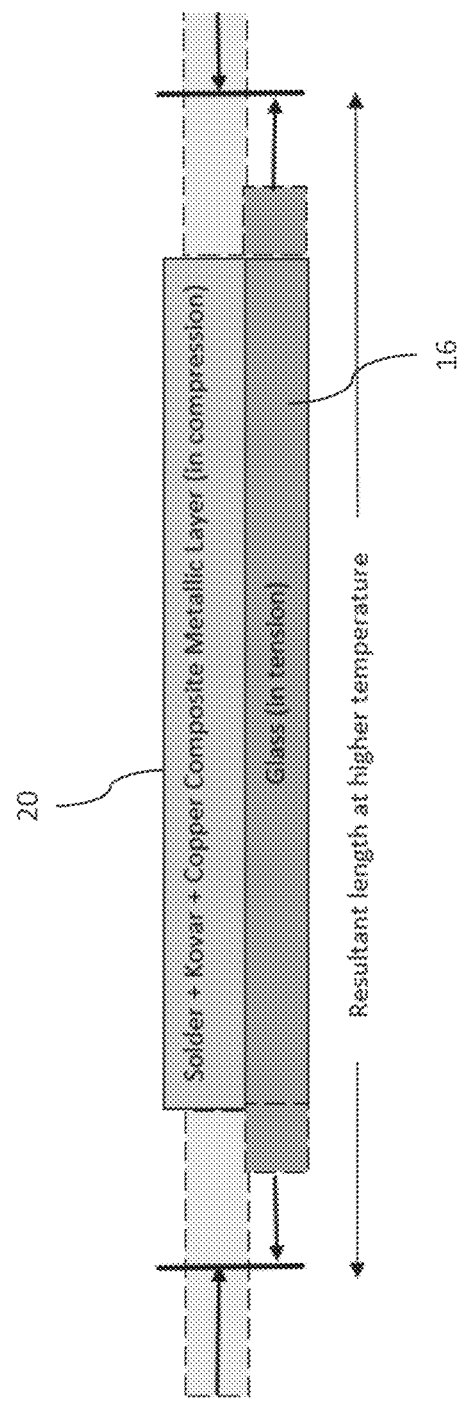
FIG. 4 is a schematic diagram of an electrical connector soldered to a silver coated glass surface illustrating stresses in the glass surface after soldering according to some embodiments.

FIG. 4 illustrates the nature of solder joints between the contact portion 20 and the glass surface 16 when CTE of glass is less than the CTE of the contact portion 20. Because of its lower CTE, the glass surface 16 should be stretched to the resultant length at high temperature and contact portion 20 should be compressed. Therefore, the glass surface 16 will be in tension and the contact portion 20 will be in compression. This will be an important consideration because the typical tensile strength for annealed glass is about 6,000 psi and the typical tensile strength for tempered glass 17,000 psi, whereas the compressive strength of both types of glass is about 150,000 psi.

Figure 5:
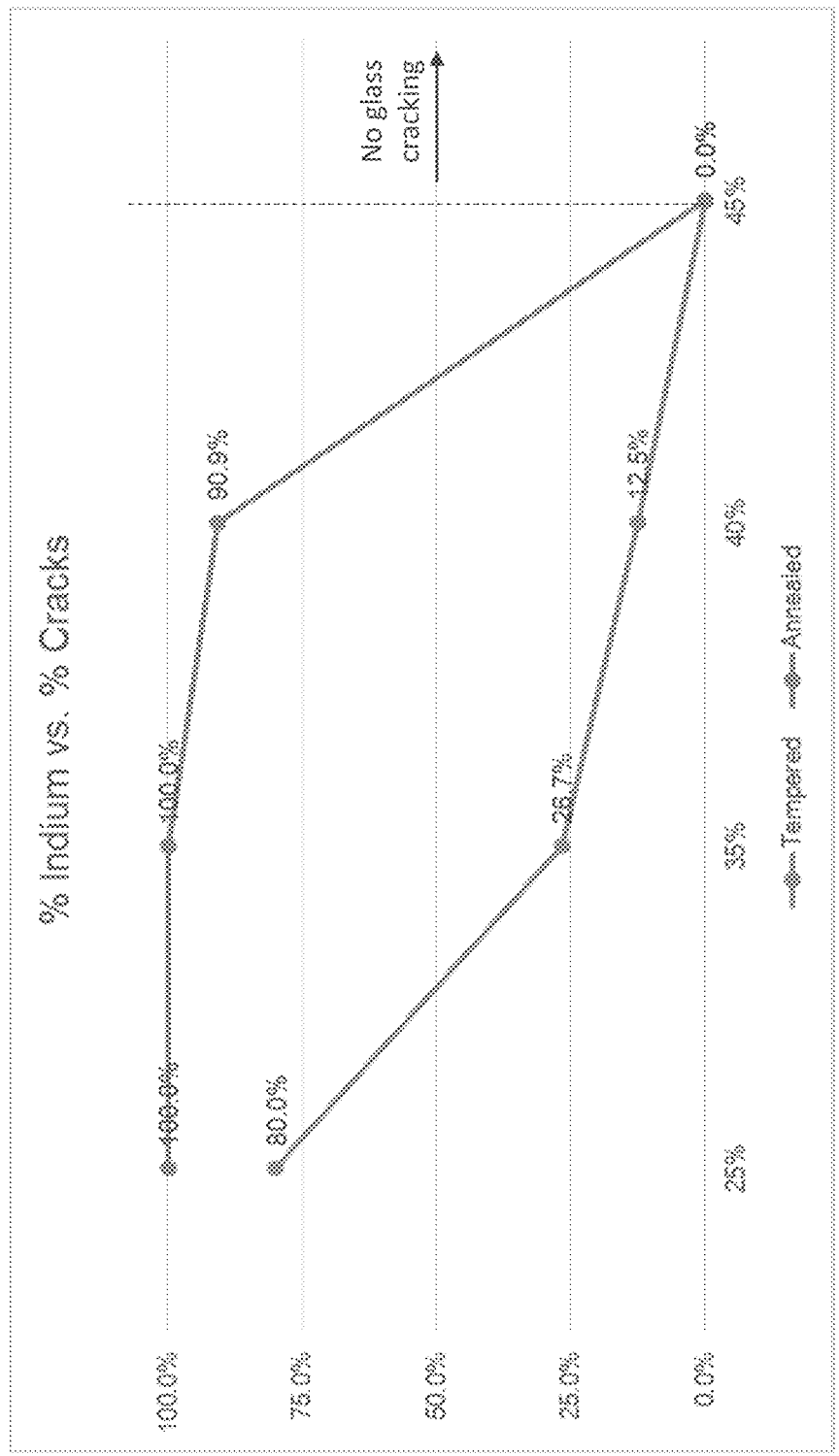
FIG. 5 is a graph of a percentage of glass samples with cracking vs. a percentage of indium in a solder alloy used to attach an electrical connector to the glass samples according to some embodiments.
Figure 6:
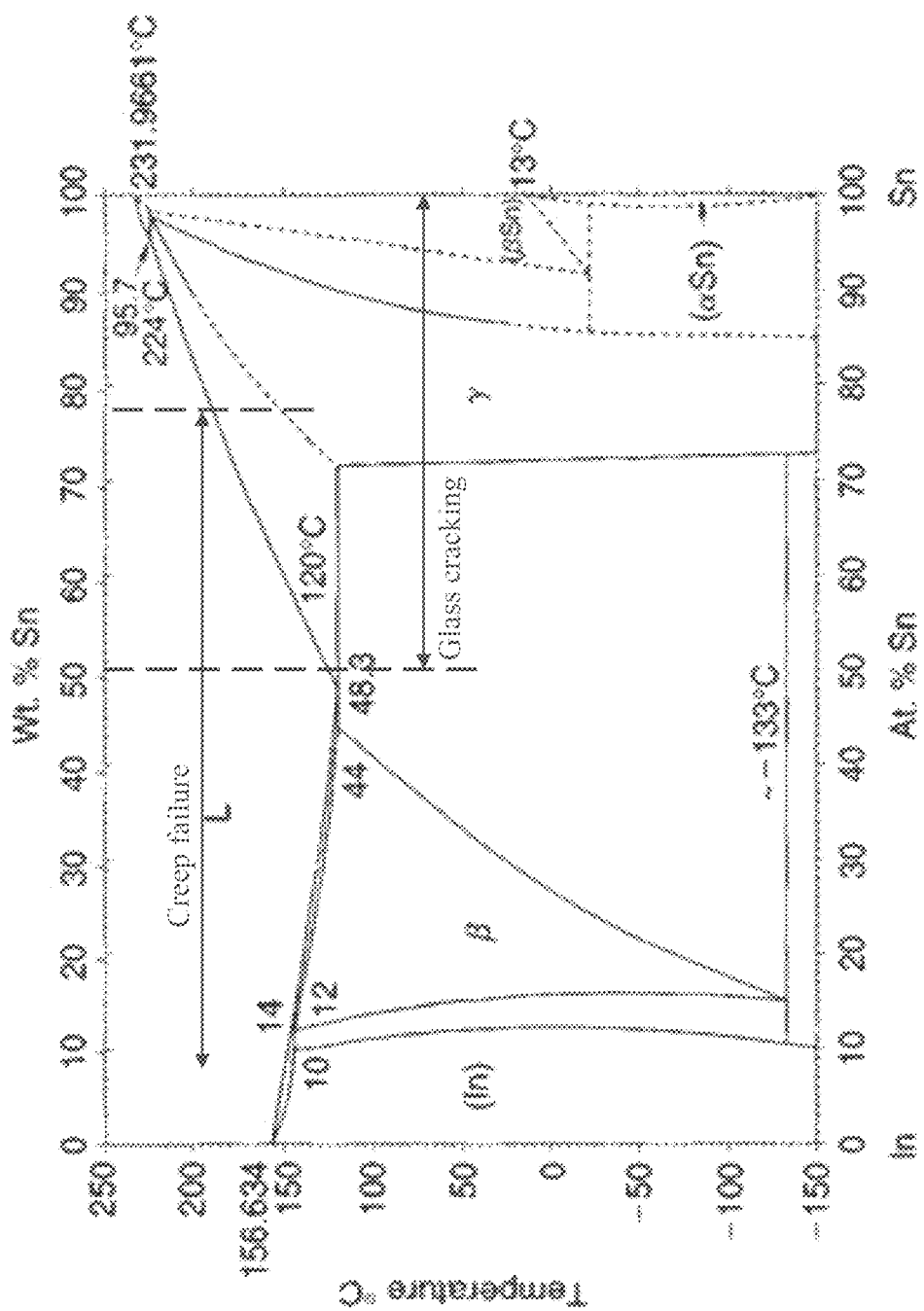
FIG. 6 an indium-tin phase diagram according to some embodiments.

Based on the graph of FIG. 5, it is evident that the percentage of cracked solder joints increased rapidly when the indium concentration of a tin-indium solder alloy is less than 45%. However, an indium content greater than 28% decreases the solidus temperature to 120° C., as evident in the indium-tin phase diagram of FIG. 6 and will lower the solder joint creep strength.

For automotive use, the electrical connector 10 must pass a test exposing the solder joint to a temperature of 140° C. with a 0.5 kg load applied, the solidus temperature should be greater than 155° C., assuming creep strength decreases rapidly at temperatures above 90% of the solidus temperature. A lower indium content (i.e., less than 42%) increases glass cracking propensity but increases creep strength even at indium concentration less than 28% as shown by the dotted lines in the indium-tin phase diagram of FIG. 7.

The layer of solder alloy 26 applied to the contact portion has a composition of about 15% to 28% indium by weight, about 5% to 20% zinc by weight, about 1% to 6% silver by weight, and about 36% to 79% tin by weight. As used herein, "about" means±1% for concentrations less than or equal to 20% and ±3% for concentrations greater than 20%.

Figure 7:
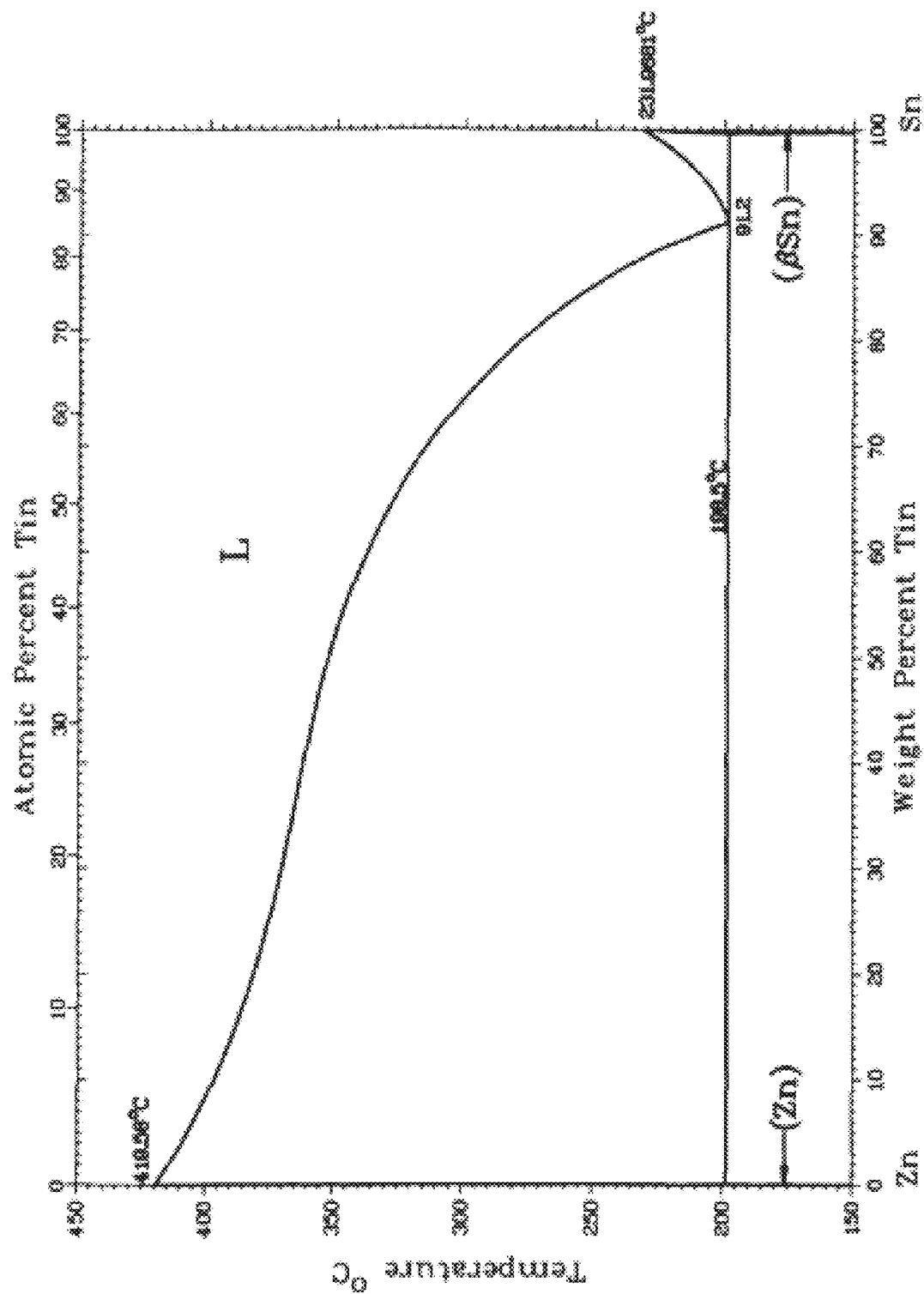
FIG. 7 is a binary phase diagram of zinc and tin according to some embodiments.
Figure 8:
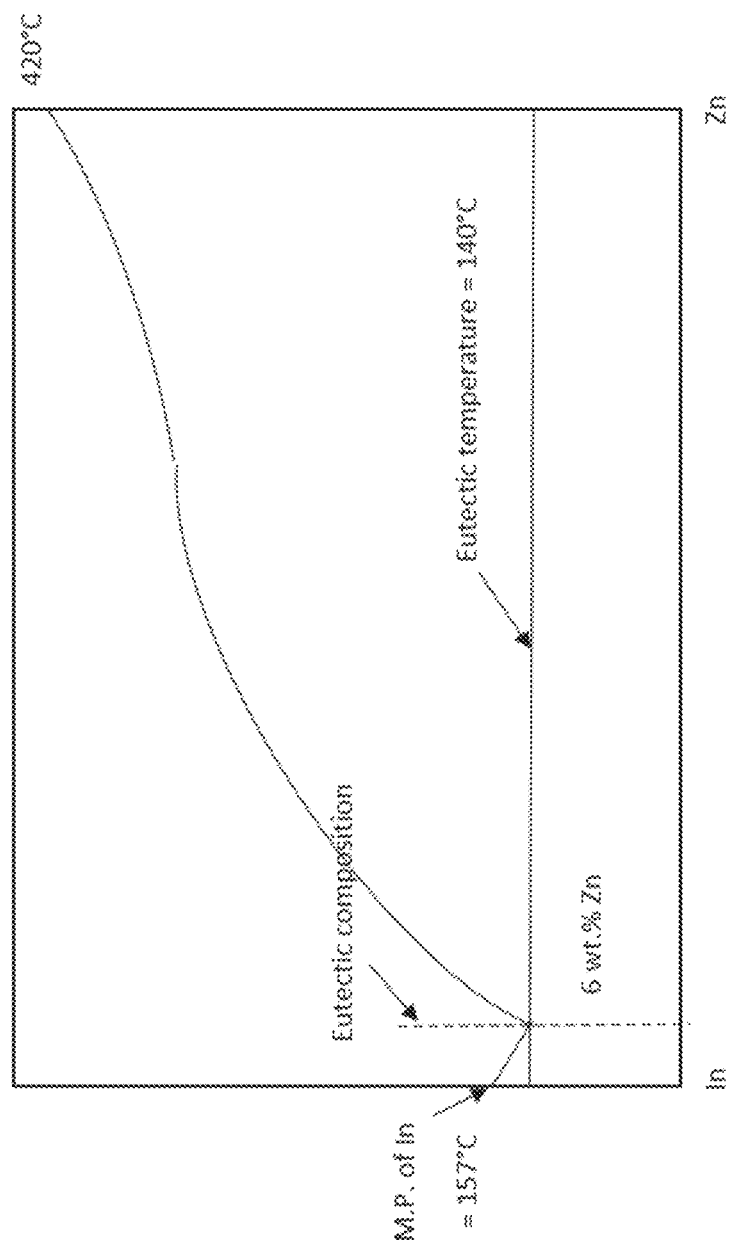
FIG. 8 is a binary phase diagram of indium and zinc according to some embodiments.
Figure 9:
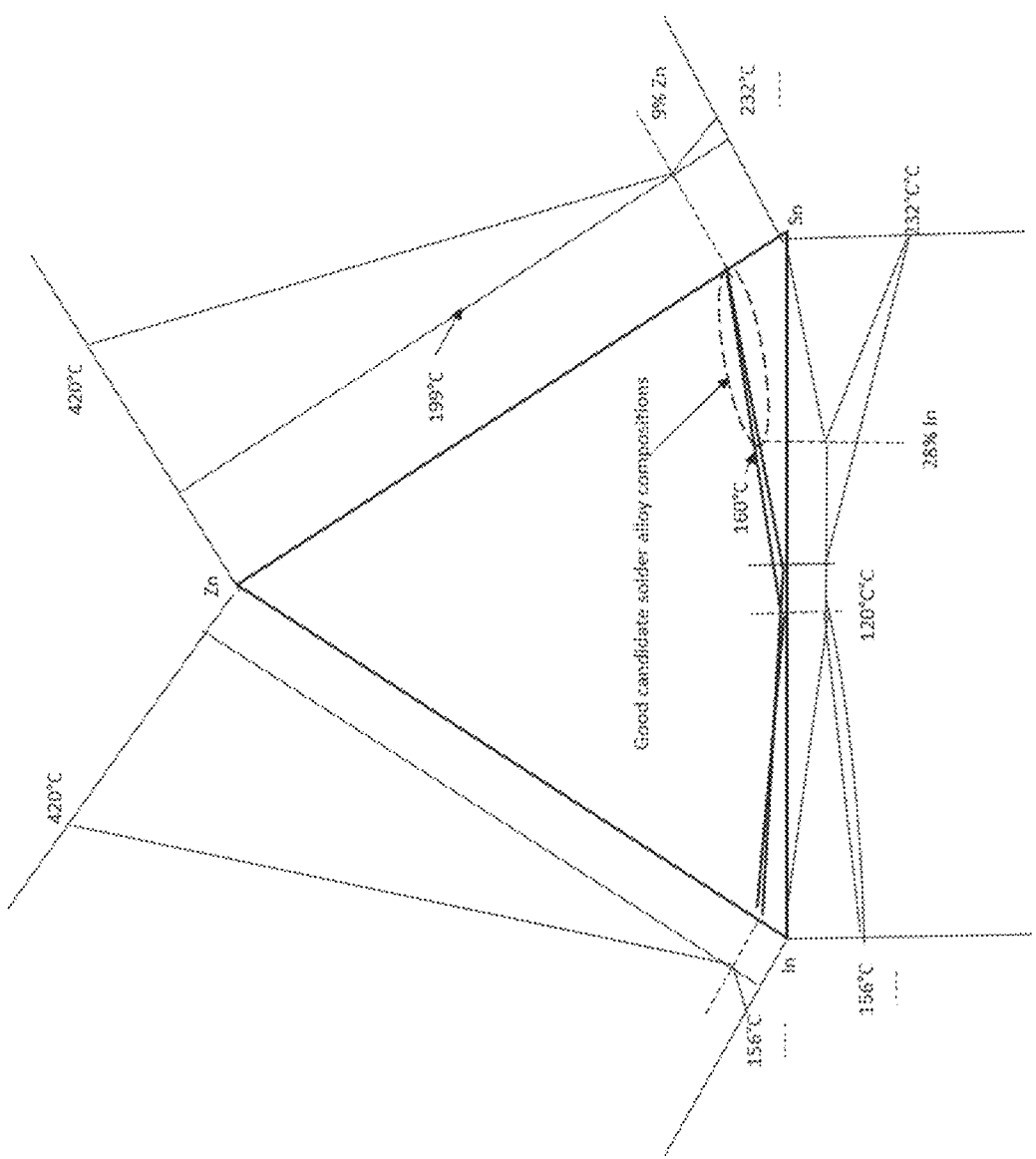
FIG. 9 is ternary phase diagram of tin, indium, and zinc showing a eutectic trough according to some embodiments.

Zinc forms eutectic alloys with both tin and indium as shown in FIGS. 7 and 8. Eutectic or near eutectic alloys are good candidates for soldering alloys. Approximate eutectic troughs in tin-indium-zinc ternary systems are shown in FIG. 9. Therefore, ternary tin-indium-zinc alloys with indium less than 28% and zinc about 5% to 20% zinc are determined to be good candidates for evaluation. A small amount of silver (about 1% to 6% by weight) is added to prevent silver migration from the contact pad on the glass to the solder alloy.

In several examples of the electrical connector 10, the second layer 24 has a thickness that is between 8% to 30% of the thickness of the contact portion 20. Electrical connectors 10 having a second layer thickness in a range of about 8% to 15% of the contact portion thickness and a solder layer containing about 24% indium by weight, about 9% zinc by weight, about 3% silver by weight, and about 64% tin by weight were able to pass a range of environmental exposure tests without causing glass cracking. Electrical connectors 10 having a second layer thickness of about 30% of the contact portion thickness and a solder layer containing about 24% indium by weight, about 9% zinc by weight, about 3% silver by weight, and about 64% tin by weight were able to pass a range of environmental exposure tests without causing glass cracking.

While the examples of the electrical connector 10 presented herein are directed to connecting wires to electrical contact pads on glass these are not limiting, and alternative embodiments may be envisioned having other uses and applications.

Accordingly, an electrical connector 10 and a solder alloy 26 is presented. The electrical connector 10 provides the benefit of providing an electrical connector between a wire cable 12 and contact pad 14 on a glass surface 16 while reducing or eliminating the incidence of glass cracking when soldering the connector 10 to the pad 14 while still meeting requirements to withstand exposure to temperatures up to 150° C. without failure of the solder joint. The solder alloy 26 has the additional benefit of lower cost by being a tin-based alloy rather than the more expensive indium-based alloy.

While preferred embodiments have been described, this disclosure is not intended to be so limited, but rather only to the extent set forth in the claims that follow. For example, the above-described embodiments (and/or aspects thereof) may be used in combination with each other. In addition, many modifications may be made to configure a situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

We claim:

1. An electrical connector, comprising:
   a first layer formed of a copper based material;
   a second layer formed of an iron-nickel alloy, wherein the second layer has a thickness 8% to 30% of the thickness of the electrical connector; and
   a solder layer formed of a solder alloy consisting essentially of:
      17% to 28% indium by weight;
      12% to 20% zinc by weight;
      1% to 6% silver by weight;
      1% to 3% copper by weight; and
      a remaining weight of the solder alloy being tin.

2. The electrical connector according to claim 1, wherein the solder alloy includes 23% to 26% indium by weight.

3. The electrical connector according to claim 1, wherein the solder alloy includes 24% to 26% indium by weight.

4. The electrical connector according to claim 1, wherein the solder alloy includes 25% to 26% indium by weight.

5. The electrical connector according to claim 1, wherein the solder alloy includes 5.5% to 6% silver by weight.

6. The electrical connector according to claim 1, wherein the solder alloy includes 5.75% to 6% silver by weight.

7. The electrical connector according to claim 1, wherein the solder layer is in direct and intimate contact with the second layer.

\* \* \* \* \*